(12) United States Patent
Rong (10) Patent No.: US 10,702,775 B2
(45) Date of Patent: Jul. 7, 2020

(54) VIRTUAL CHARACTER CONTROL METHOD, APPARATUS, STORAGE MEDIUM AND ELECTRONIC DEVICE

(71) Applicant: NETEASE (HANGZHOU) NETWORK CO., LTD., Zhejiang (CN)

(72) Inventor: Hua Rong, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 59 days.

(21) Appl. No.: 15/965,863

(22) Filed: Apr. 28, 2018

(65) Prior Publication Data

US 2018/0369693 A1    Dec. 27, 2018

(30) Foreign Application Priority Data

Jun. 26, 2017    (CN) .......................... 2017 1 0496350

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *A63F 13/426* | (2014.01) |

(Continued)

(52) U.S. Cl.
CPC ........ *A63F 13/426* (2014.09); *A63F 13/2145* (2014.09); *A63F 13/822* (2014.09); *A63F 13/92* (2014.09); *G06F 3/0481* (2013.01); *G06F 3/0484* (2013.01); *G06F 3/04883* (2013.01); *G06T 13/40* (2013.01); *G06F 2203/04802* (2013.01); *G06F 2203/04808* (2013.01); *G06T 2200/24* (2013.01)

(58) Field of Classification Search
USPC ....................... 463/1, 9, 20, 30, 31
See application file for complete search history.

(56) References Cited

U.S. PATENT DOCUMENTS

| | | | | |
|---|---|---|---|---|
| 2013/0169668 A1* | 7/2013 | Lynch | ................ | G01C 21/3638 345/619 |
| 2015/0157932 A1* | 6/2015 | Kwon | .................... | G06Q 50/00 463/31 |

FOREIGN PATENT DOCUMENTS

| | | |
|---|---|---|
| CN | 105194873 A | 12/2015 |
| CN | 106512406 A | 3/2017 |

OTHER PUBLICATIONS

Search report for CN priority application No. 201710496350.5 filed on Jun. 26, 2017, dated Jul. 5, 2018.

* cited by examiner

*Primary Examiner* — Adetokunbo O Torimiro
(74) *Attorney, Agent, or Firm* — Gang Yu (57) ABSTRACT

A virtual character control method and apparatus, a storage medium and an electronic device are provided. The method includes that: a skill control is rendered on a graphical user interface; when a first touch event for the skill control is detected, a target selection control is rendered in a vicinity of the skill control; a second touch event for the target selection control is detected, a present target selection condition is determined according to an sub-control which is presently selected in response to the second touch event, and at least one second virtual character consistent with the present target selection condition is selected in real time from a predetermined distance range as a target of a skill operation; and when the end of the second touch event is detected, a first virtual character is controlled to execute the skill operation on the target which is presently selected.

20 Claims, 5 Drawing Sheets

(51) Int. Cl.
*G06T 13/40* (2011.01)
*G06F 3/0481* (2013.01)
*G06F 3/0488* (2013.01)
*G06F 3/0484* (2013.01)
*A63F 13/92* (2014.01)
*A63F 13/822* (2014.01)
*A63F 13/2145* (2014.01)

VIRTUAL CHARACTER CONTROL METHOD, APPARATUS, STORAGE MEDIUM AND ELECTRONIC DEVICE

TECHNICAL FIELD

The present disclosure relates to the technical field of human-computer interaction, and in particular to a virtual character controls method and apparatus, a storage medium and an electronic device.

BACKGROUND

In at least one mobile game (including at least one game running in a smart phone or a tablet computer), a virtual character usually has a directed skill. That is, a release target of the directed skill is another specific virtual character, for example, an attack skill for an enemy character or a healing skill for an ally character.

SUMMARY

At least some embodiments of the present disclosure provide a virtual character control method and apparatus, a storage medium and an electronic device.

In one embodiment of the present disclosure, a virtual character control method is provided by executing a software application on a processor of a mobile terminal and performing rendering a graphical user interface on a touch display screen of the mobile terminal, the method including: rendering multiple virtual characters on the graphical user interface, and the multiple virtual characters include a first virtual character and at least one second virtual character, the first virtual character is configured to execute a virtual operation according to a touch event of a user on the touch display screen, and the virtual operation includes a skill operation for the at least one second virtual character; rendering a skill control on the graphical user interface, and the skill control corresponds to the skill operation; when a first touch event for the skill control is detected, rendering a target selection control in a vicinity of the skill control, the target selection control including multiple sub-controls, each sub-control corresponding to a predetermined target selection condition and the target selection condition being configured to select a target of the skill operation from the at least one second virtual character; detecting a second control event for the target selection control, determining a present target selection condition according to the sub-control presently selected in response to the second touch event, and selecting at least one second virtual character consistent with the present target selection condition in real time from a predetermined distance range as the target of the skill operation; and when the end of the second touch event is detected, controlling the first virtual character to execute the skill operation on the target which is presently selected.

In an optional embodiment, the method further includes: identifying at least one of the sub-control which is presently selected and the target which is presently selected in real time.

In an optional embodiment, the method further includes: displaying a connecting line in real time between the first virtual character and the target which is presently selected.

In an optional embodiment, the predetermined distance range is a circular region, and a circle center of the circular region is a real-time position of the first virtual character, and a radius of the circular region is a predetermined length.

In an optional embodiment, after the first touch event for the skill control is detected and before the second touch event ends, the predetermined distance range is displayed in a predetermined manner.

In an optional embodiment, the first touch event is one of the following operations for the skill control: tap, long press, double tap and swipe touch.

In an optional embodiment, the second touch event and the first touch event are continuous touch events.

In an optional embodiment, the skill control is circular, and the target selection control is a ring-shaped control surrounding the skill control.

In an optional embodiment, a manner for determining that the second touch event ends includes one of the followings: determining termination of a contact between a touch character and the touch display screen, and determining a touch point is moved out of the target selection control.

In one embodiment of the present disclosure, a virtual character control apparatus is further provided, which is applied to a mobile terminal, the mobile terminal obtains a graphical user interface by executing a software application on a processor and performing rendering on a touch display screen, the apparatus including: a virtual character rendering component, arranged to render multiple virtual characters on the graphical user interface, and the multiple virtual characters include a first virtual character and at least one second virtual character, the first virtual character is configured to execute a virtual operation according to a touch event of a user on the touch display screen, and the virtual operation includes a skill operation for the at least one second virtual character; a skill control rendering component, arranged to render a skill control on the graphical user interface, and the skill control corresponds to the skill operation; a target selection control rendering component, arranged to, when a first touch event for the skill control is detected, render a target selection control in a vicinity of the skill control, the target selection control including multiple sub-controls, each sub-control corresponding to a predetermined target selection condition and the target selection condition being configured to select a target of the skill operation from the at least one second virtual character; a target selection component, arranged to detect a second control event for the target selection control, determine a present target selection condition according to the sub-control presently selected in response to the second touch event and select at least one second virtual character consistent with the present target selection condition in real time from a predetermined distance range as the target of the skill operation; and a skill operation component, arranged to, when the end of the second touch event is detected, control the first virtual character to execute the skill operation on the target which is presently selected.

In one embodiment of the present disclosure, a computer-readable storage medium is further provided, on which at least one computer program is stored, and the at least one computer program being executed by a processor to implement the above-mentioned virtual character control method.

In one embodiment of the present disclosure, an electronic device is further provided, which includes: a processor; and a memory, arranged to store at least one executable instruction of the processor, and the processor is arranged to execute the at least one executable instruction to execute the above-mentioned virtual character control method.

DETAILED DESCRIPTION

For making the solutions of the present disclosure better understood by those skilled in the art, the technical solutions in the embodiments of the present disclosure will be clearly and completely described below in combination with the drawings in the embodiments of the present disclosure.

The following two solutions for performing target selection in a process of controlling a virtual character to release the directed skill are provided.

In the first solution, a system automatically determines an attack target. According to this solution, the system effectively and intelligently determines the attack target, and the system may determine a better target to a certain extent, so that operating efficiency is higher. However, an application range of this solution is limited to a certain extent. Uncertainty about the attack target may be inconsistent with an expectation of a player. Meanwhile, this solution may also reduce a game experience of the game player.

In the second solution, a game player selects an attack target through at least one target portrait provided in a game. According to the solution, portraits of enemy characters controlled by all players in a vicinity of the virtual character are displayed. And the game player selects a target portrait from the displayed portraits to add an enemy locking function. Then, all attack skills are released to an enemy character corresponding to the target portrait, so that release accuracy is further improved. However, the solution has the following problems.

In a first problem, the at least one target portrait provided in the game is smaller, and in addition, a position and number of the at least one target portrait are changed according to a change in a number of the players in the vicinity, so that difficulties for the game player in identification are increased. And an operation burden of the game player may also be increased by a taping operation of selecting the target portrait from the displayed portraits.

In a second problem, a function is usually a one-time selection operation during fighting in the game. However, when a fighting situation is changed, the function brings inconvenience, and the game player may change a new attack target only after manual unlocking.

Figure 1:
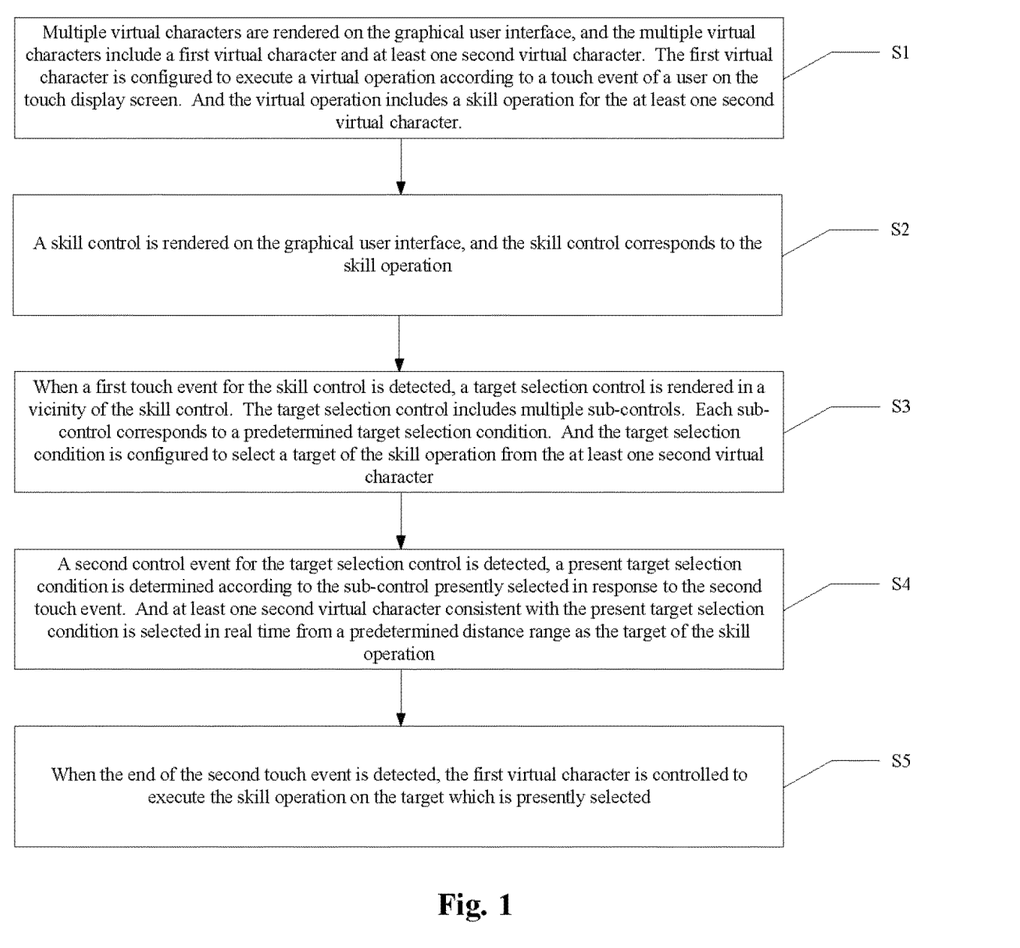
FIG. 1 is a flowchart of a virtual character control method according to an embodiment of the present disclosure.

FIG. 1 is a flowchart of a virtual character control method according to an embodiment of the present disclosure. According to an embodiment as shown in FIG. 1, the method is provided by executing a software application on a processor of a mobile terminal and performing rendering a graphical user interface on a touch display screen of the mobile terminal, and the method includes the following steps.

At Step S1, multiple virtual characters are rendered on the graphical user interface, and the multiple virtual characters include a first virtual character (i.e., a game role controlled by a game player) and at least one second virtual character (i.e., at least one enemy character and at least one other ally character). The first virtual character is configured to execute a virtual operation (including movement, jumping, ordinary attack and the like) according to a touch event of a user (i.e., the game player) on the touch display screen. And the virtual operation includes a skill operation (i.e., release of a directed skill) for the at least one second virtual character.

At Step S2, a skill control (i.e., a skill button) is rendered on the graphical user interface, and the skill control corresponds to the skill operation.

At Step S3, when a first touch event for the skill control is detected, a target selection control is rendered in a vicinity of the skill control. The target selection control includes multiple sub-controls. Each sub-control corresponds to a predetermined target selection condition. And the target selection condition is configured to select a target of the skill operation from the at least one second virtual character.

At Step S4, a second control event for the target selection control is detected, a present target selection condition is determined according to the sub-control presently selected in response to the second touch event. And at least one second virtual character consistent with the present target selection condition is selected in real time from a predetermined distance range (which may not only be an area reachable for skill release but also a range reachable for a visual field of the player) as the target of the skill operation.

At Step S5, when the end of the second touch event is detected, the first virtual character is controlled to execute the skill operation on the target which is presently selected.

According to the embodiment, multiple target selection conditions are provided for the player through the target selection control, so that the target of the skill operation is selected from the predetermined distance range according to the target selection condition selected by the player. Then, the player may select the target of the skill operation according to a real-time change of fighting in a game and according to a judgment and willing of the player in combination with the first touch event and the second touch event. Compared with at least one directed skill target selection solution in the related art, the technical solution provided by the embodiment has higher real-time performance and independence and better user experience on the premise of not increasing an operation burden.

The virtual character control method in the embodiment will further be described below with reference to FIGS. 2-6.

Figure 2:
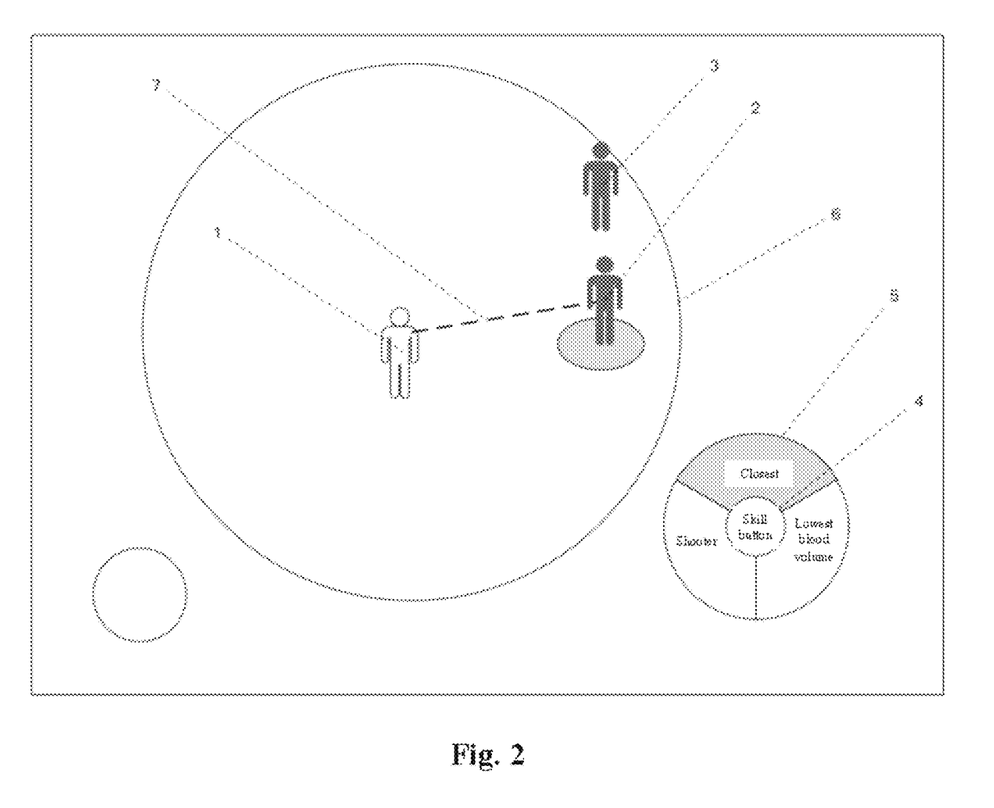
FIG. 2 is a schematic diagram of a user interaction interface of a virtual character control method according to an exemplary embodiment of the present disclosure.

FIG. 2 is a schematic diagram of a user interaction interface of a virtual character control method according to an exemplary embodiment of the present disclosure. In the exemplary embodiment as shown in FIG. 2, the present user interaction interface includes a first virtual character 1 (i.e., a white character) controlled by a player and two second virtual characters 2 and 3 (i.e., black characters). Due to detection of a first touch event for a circular skill control (i.e., a skill button 4), a ring-shaped target selection control 5 is displayed around the skill control. The target selection control is formed by three sub-controls, i.e., "closest", "lowest blood volume" and "shooter" respectively. According to a second control event for the target selection control, a sub-control which is presently selected is "closest". The second virtual characters 2 and 3 are positioned within a predetermined distance range 6 at present. According to the target selection condition corresponding to the sub-control which is presently selected, a target which is presently selected is the second virtual character 2.

The player may define target selection conditions for the directed skill in a setting interface to set types and number of the target selection conditions for the directed skill. Besides the three options "closest", "lowest blood volume" and "shooter" listed in this exemplary embodiment, the player may further define other options, for example, "the enemy outputs", "highest blood volume", "tank of the enemy" and "lowest blood volume percent". According to a principle of easiness for use, the number of the self-defined target selection conditions is better with 2-5. If the target selection conditions are not defined by the player, at least one default option may be provided. And at least one corresponding default sub-control may also be extended when the directed skill is used in the game.

Figure 3:
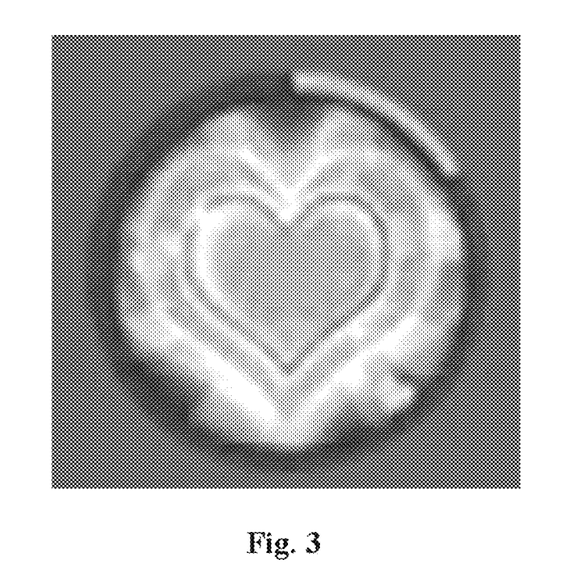
FIG. 3 is a schematic diagram of a state when a skill control is not triggered according to an exemplary embodiment of the present disclosure.
Figure 4:
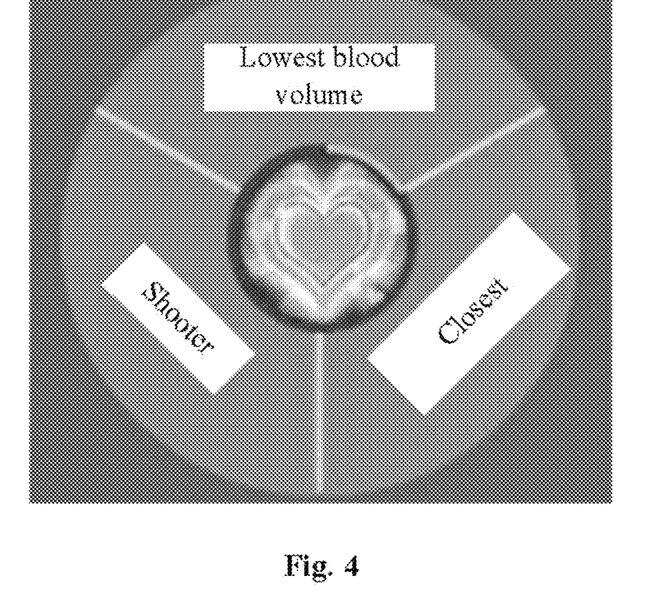
FIG. 4 is a schematic diagram of a state when a skill control is triggered according to an exemplary embodiment of the present disclosure.
Figure 5:
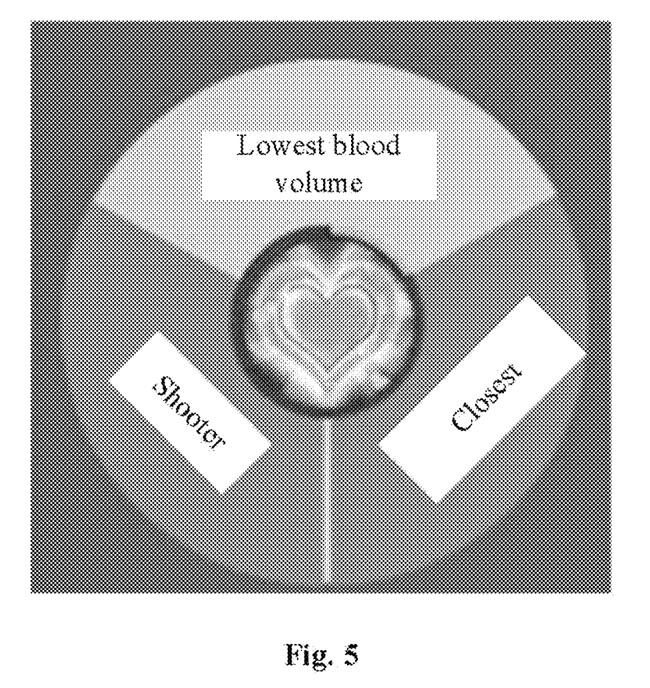
FIG. 5 is a schematic diagram of a state when a skill control is selected according to an exemplary embodiment of the present disclosure.
Figure 6:
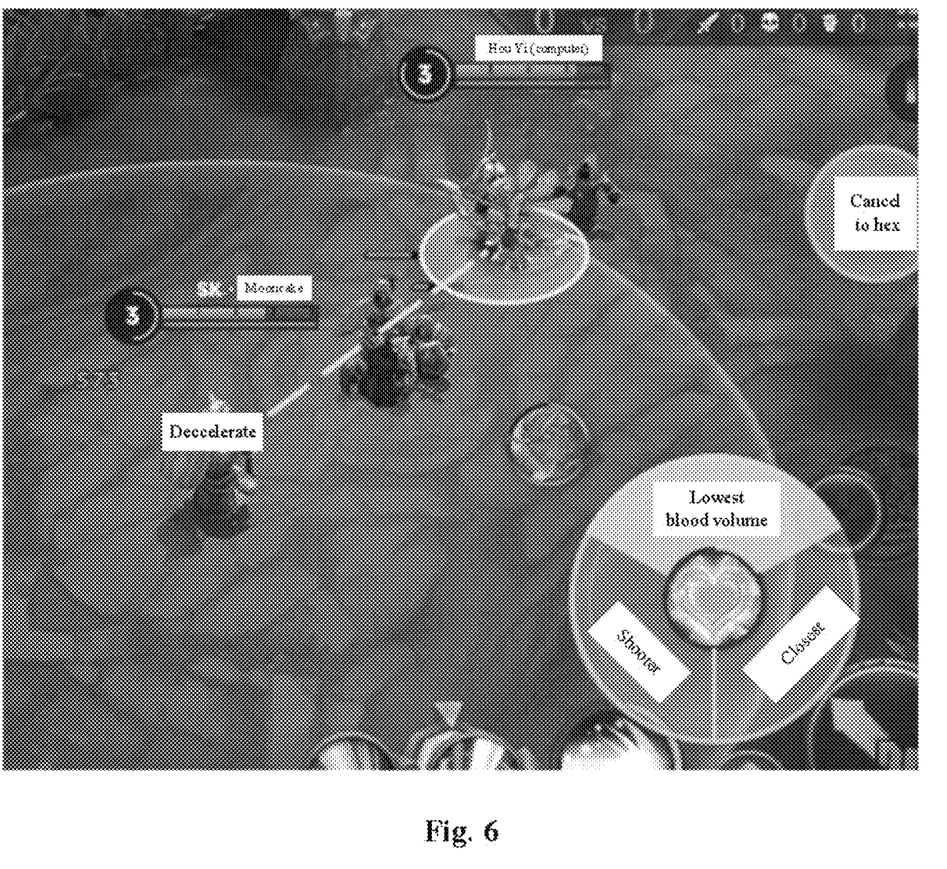
FIG. 6 is an image when a virtual character control method is applied to a game according to an exemplary embodiment of the present disclosure.

FIG. 3 is a schematic diagram of a state when a skill control is not triggered according to an exemplary embodiment of the present disclosure. In the exemplary embodiment as shown in FIG. 3, when the skill control is not touched, no target selection control is displayed around the skill control. FIG. 4 is a schematic diagram of a state when a skill control is triggered according to an exemplary embodiment of the present disclosure. In the exemplary embodiment as shown in FIG. 4, when the skill control is triggered by the first touch event and the second touch event is not detected, the target selection control is displayed around the skill control. FIG. 5 is a schematic diagram of a state when a skill control is selected according to an exemplary embodiment of the present disclosure. In the exemplary embodiment as shown in FIG. 5, after the second touch event is detected, the selected sub-control "lowest blood volume" in the target selection control is displayed in a highlighted manner. FIG. 6 is an image when a virtual character control method is applied to a game according to an exemplary embodiment of the present disclosure. In the exemplary embodiment as shown in FIG. 6, according to the target selection condition corresponding to the selected sub-control, there is a straight dotted line between the target which is presently selected and the first virtual character to prompt a position where a skill release target is located to the player.

In an optional implementation mode, the method further includes that: at least one of the sub-control which is presently selected and the target which is presently selected is identified in real time. Specifically, not only may the sub-control which is presently selected and the target which is presently selected be identified at the same time, but also one of the sub-control which is presently selected and the target which is presently selected may be identified. An identification manner may be distinctive display, highlighted display, an additional indication mark and the like. In the exemplary embodiments as shown in FIGS. 5 and 6, the sub-control "lowest blood volume" which is presently selected is light grey, different from dark grey of the other sub-controls. In the exemplary embodiments as shown in FIGS. 2 and 6, a ground where the target which is presently selected (i.e., the second virtual character 2) is located displays an indication mark in a color different from the ground and a specific shape (for example, a round). The selected sub-control and the target are marked in real time, so that the target selection condition presently selected by the player and the specific target may be prompted to the player for the player to make a decision according to a fighting condition in the game. Of course, if there exists no target consistent with the selected condition within the predetermined distance range at present, no corresponding target selection effect may be displayed, and the skill may not be successfully released.

In an optional implementation mode, the method further includes that: a connecting line is displayed in real time between the first virtual character and the present target. The connecting line may be a straight line, a curve, a solid line or a curve. The connecting line plays a role of an aiming line, and may enhance an effect of selecting the target as a skill release object. In the exemplary embodiment as shown in FIG. 2, the first virtual character is connected with the second virtual character 2 selected as the target which is presently selected through an aiming line in form of a straight dotted line. And the second virtual character 2 is selected by the player through the sub-control "closest" which is presently selected. The target aiming line is a visual aid adopted by the function to assist target identification and determination. The assistant aiming line may point to a target consistent with the selected condition as a default. However, if the target departs from a skill range when being pointed to, the assistant aiming line may be switched to a new target consistent with the condition immediately. When there is no target consistent with the condition within the skill range or the unique target originally consistent with the condition departs from the skill range, no aiming line may be displayed.

In an optional implementation mode, the predetermined distance range is a circular region. And a circle center of the circular region is a real-time position of the first virtual character, and a radius of the circular region is a predetermined length. After the first touch event for the skill control is detected and before the second touch event ends, the predetermined distance range is displayed in a predetermined manner. The predetermined distance range 6 as shown in FIG. 2 is displayed through a circle taking the first virtual character as a circle center. The player learns about the specific second virtual characters to which the skill may be released at present in real time through the circle in a process of controlling the first virtual character to execute the skill operation. The circle may be displayed in the user interaction interface, and may further be distinctively displayed on a ground within the predetermined distance range, or all of the second virtual characters within the predetermined distance range are marked. As mentioned above, besides the skill release range, the predetermined distance range may also be a range reachable for the visual field of the game player. For example, some directed skills may be released by controlling a role of the player is moved to the target after these directed skills are confirmed to release to the selected target. When the target is selected, selectable objects may not always be within the skill release range of the role of the player, as long as the selectable objects are reachable for the visual field of the role of the player.

In an optional implementation mode, the first touch event is one of the following operations for the skill button: tap, long press, double tap and swipe touch. Specifically, the first touch event triggering the target selection control to be rendered in the vicinity of the skill control may be one of the following conditions.

In a first condition, the first touch event may be tap of a user over the skill control.

In a second condition, a touch of the user over the skill control exceeds a predetermined duration.

In a third condition, the user double-taps the skill control.

In a fourth condition, the user touches and swipes the skill control for a predetermined distance on a touch display screen with a finger.

In an optional implementation mode, the second touch event and the first touch event are continuous touch events. For reducing a number of touch times and simplifying at least one touch operation, an optional implementation mode is that the first touch event and the second touch event belong to a continuous touch behavior. During execution of the touch behavior, a finger of the user does not leave a touch display screen of a mobile device. For example, after the finger of the user touches the skill control, the target selection control is triggered to be rendered in the vicinity of the skill control. The finger does not leave the touch display screen, directly swipes to the target selection control and executes a swipe selection operation between multiple sub-controls to select the corresponding target selection condition. Under the condition that a directed skill release operation is a one-time touch, touch may be stopped after a first touch is executed. For example, after the skill control is taped, the finger may leave the screen, and a system may directly select the target with a default target selection condition and release the skill.

Besides completion of directed skill release through one touch operation, the operation may also be set to be completed through multiple touch operations. For example, the skill control is taped by a first touch (which may also be double tap or long press), a second touch is performed on the target selection control to select the target selection condition, and the second touch ends to release the skill.

In an optional implementation mode, ending of the second touch event includes termination of a contact between a touch object and the display screen or movement of a touch point out of the target selection control. By the second touch event, the user selects the target selection condition, thereby selecting the target of the skill operation. By ending the second touch event, the first virtual character is triggered to execute the skill operation on the target selected when the second touch event ends. Ending of the second touch event may refer to that the finger of the user leaves the touch display screen and may also be movement of the touch point out of the target selection control.

Figure 7:
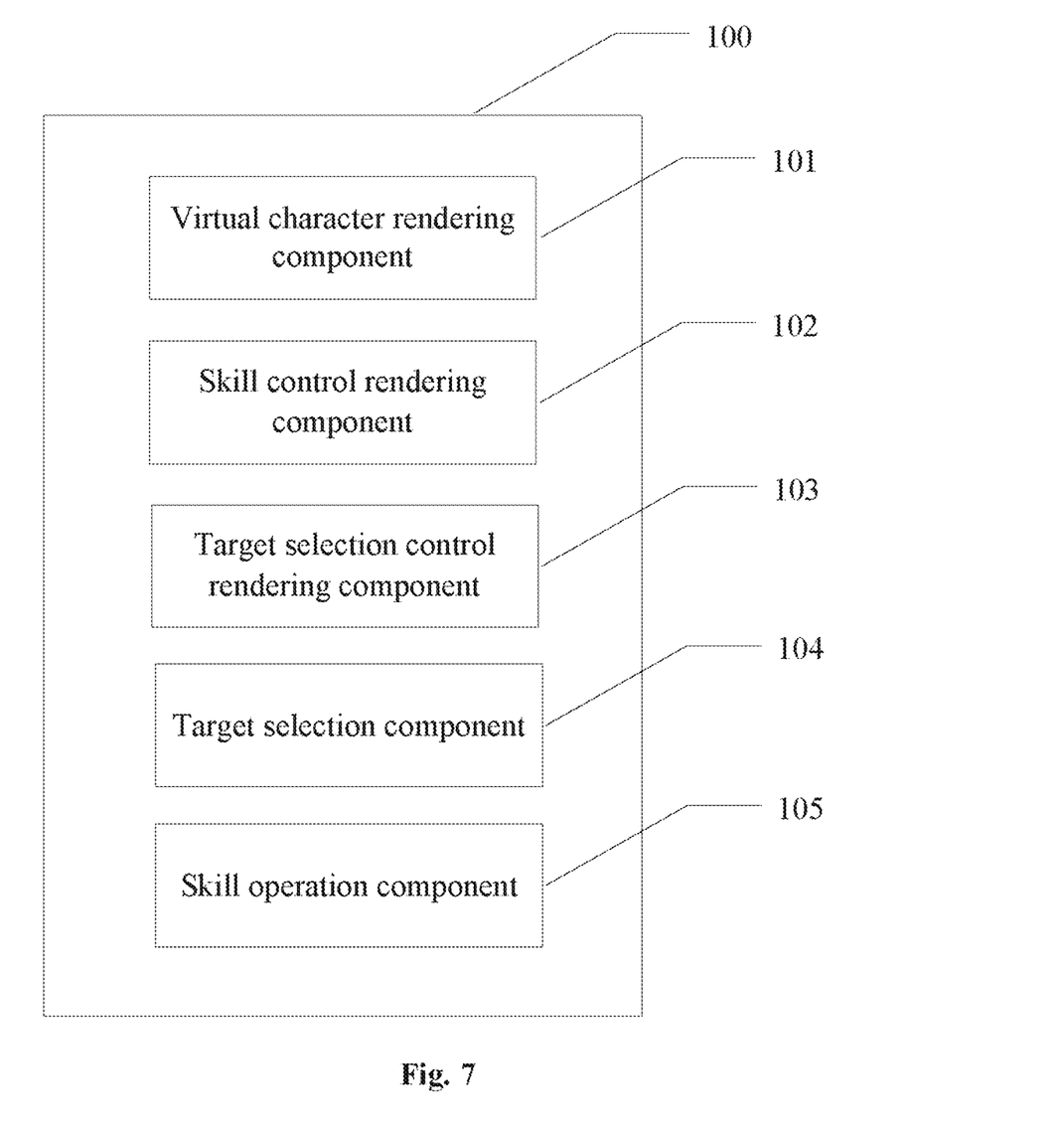
FIG. 7 is a structural block diagram of a virtual character control apparatus according to an embodiment of the present disclosure.

FIG. 7 is a structural block diagram of a virtual character control apparatus according to an embodiment of the present disclosure. The virtual character control apparatus 100 is applied to a mobile terminal, and the mobile terminal obtains a graphical user interface by executing a software application on a processor and performing rendering on a touch display. In the embodiment as shown in FIG. 7, the apparatus includes: a virtual character rendering component 101, a skill control rendering component 102, a target selection control rendering component 103, a target selection component 104 and a skill operation component 105.

The virtual character rendering component 101 is arranged to render multiple virtual characters on the graphical user interface. And the multiple virtual characters include a first virtual character and at least one second virtual character. The first virtual character is configured to execute a virtual operation according to a touch event of a user on the touch display screen, and the virtual operation includes a skill operation for the at least one second virtual character.

The skill control rendering component 102 is arranged to render a skill control on the graphical user interface, and the skill control corresponds to the skill operation.

The target selection control rendering component 103 is arranged to, when a first touch event for the skill control is detected, render a target selection control in the vicinity of the skill control. The target selection control includes multiple sub-controls. Each sub-control corresponds to a predetermined target selection condition. And the target selection condition is configured to select a target of the skill operation from the at least one second virtual character.

The target selection component 104 is arranged to detect a second control event for the target selection control, determine a present target selection condition according to the sub-control presently selected in response to the second touch event and select at least one second virtual character consistent with the present target selection condition in real time from a predetermined distance range as the target of the skill operation.

The skill operation component 105 is arranged to, when that the end of the second touch event is detected, control the first virtual character to execute the skill operation on the target which is presently selected.

In one embodiment of the present disclosure, an electronic device is further provided. The electronic device includes: a processing component, which may further include one or more processors, and a memory resource represented by a memory, arranged to store instructions executable for the processing component, for example, application programs. The application programs stored in the memory may include one or more than one component of which each corresponds to a set of instructions. In addition, the processing component is configured to execute the instructions to execute the above-mentioned virtual character control method.

The electronic device may further include: a power component, a wired or wireless network interface and an Input/Output (I/O) interface. The power component is arranged to perform power management on the electronic device. The wired or wireless network interface is arranged to connect the electronic device to a network. The electronic device may be operated on the basis of an operating system stored in the memory, for example, Android, iOS, Windows, Mac OS X, Unix, Linux, Free BSD or the like.

According to one embodiment of the present disclosure, a computer-readable storage medium is further provided, on which a program product capable of implementing the method of the specification is stored. In some possible implementation modes, each aspect of the present disclosure may further be implemented as a form of a program product, which includes a program code. When the program product runs on a terminal device, the program code is configured to enable the terminal device to execute the steps described in the "exemplary method" part of the specification according to various exemplary implementation modes of the present disclosure. The program product may adopt a portable Compact Disc Read-Only Memory (CD-ROM) and include the program code and may run on the terminal device, for example, a personal computer. However, the program product of the present disclosure is not limited. In the present disclosure, the readable storage medium may be any physical medium including or storing a program, and the program may be used by or used in combination with an instruction execution system, device or apparatus.

The program product may adopt one or any combination of multiple readable media. The readable medium may be a readable signal medium or a readable storage medium. The readable storage medium may be, but not limited to, for example, electric, magnetic, optical, electromagnetic, infrared or semiconductor systems, devices or apparatuses or any combination thereof. A more specific example (non-exhausted list) of the readable storage medium includes: an electrical connection with one or more wires, a portable disk, a hard disk, a Random Access Memory (RAM), a Read-Only Memory (ROM), an Erasable Programmable ROM (EPROM) or flash memory, an optical fiber, a portable CD-ROM, an optical storage device, a magnetic storage device or any proper combination thereof.

Obviously, the described embodiments are not all embodiments but part of embodiments of the present disclosure. All other embodiments obtained by those of ordinary skilled in the art on the basis of the embodiments in the present disclosure without creative work shall fall within the scope of protection of the present disclosure.

It is important to note that terms "first", "second" and the like in the specification, claims and drawings of the present disclosure are adopted not to describe a specific sequence or order but only to distinguish similar objects. It should be understood that data used like this may be exchanged under a proper condition for implementation of the embodiments of the present disclosure described here in a sequence except those sequences shown or described here. In addition, terms "include" and "have" and any transformations thereof are intended to cover nonexclusive inclusions. For example, a process, method, system, product or device including a series of steps or units is not limited to those steps or units which are clearly listed, but may include other steps or units which are not clearly listed or intrinsic to the process, the method, the product or the device.

The steps shown in the flowcharts of the drawings may be executed in a computer system, for example, a group of computers, capable of executing instructions. Moreover, although logic sequences are shown in the flowcharts, the shown or described steps may be executed in sequences different from the sequences shown here under some conditions.

Sequence numbers of the embodiments of the present disclosure are adopted for description and do not represent quality of the embodiments.

Each embodiment in the embodiments of the present disclosure is described with different emphases, and parts which are not elaborated in a certain embodiment may refer to related descriptions of the other embodiments.

In some embodiments provided by the application, it should be understood that the disclosed technical content may be implemented in another manner. The apparatus embodiment described above is schematic, and for example, division of the units is only logic function division, and other division manners may be adopted during practical implementation. For example, multiple units or components may be combined or integrated into another system, or some characteristics may be neglected or not executed. In addition, coupling or indirect coupling or communication connection between each displayed or discussed component may be indirect coupling or communication connection, implemented through some interfaces, of the units or components, and may be electrical or adopt other forms.

The above-mentioned units described as separate parts may or may not be physically separated, and parts displayed as units may or may not be physical units, and namely may be located in the same place, or may also be distributed to multiple units. Part or all of the units may be selected to achieve the purpose of the solutions of the embodiments according to a practical requirement.

In addition, each function unit in each embodiment of the present disclosure may be integrated into a processing unit, each unit may also exist physically independently, and two or more than two units may also be integrated into a unit.

The above-mentioned integrated unit may be implemented in a hardware form, and may also be implemented in form of software function unit.

When being implemented in form of software function unit and sold or used as an independent product, the integrated unit may also be stored in a computer-readable storage medium. Based on such an understanding, the technical solutions of the present disclosure substantially or parts making contributions to the conventional art or all or part of the technical solutions may be embodied in form of software product. The computer software product is stored in a storage medium, including a plurality of instructions configured to enable a computer device (which may be a personal computer, a server, a network device or the like) to execute all or part of the steps of the method in each embodiment of the present disclosure.

The above are exemplary implementation modes of the present disclosure. It should be pointed out that those of ordinary skilled in the art may further make a plurality of improvements and embellishments without departing from the principle of the present disclosure and these improvements and embellishments shall also fall within the scope of protection of the present disclosure.

What is claimed is:

1. A virtual character control method provided by executing a software application on a processor of a mobile terminal and performing rendering a graphical user interface on a touch display screen of the mobile terminal, the method comprising:

rendering a plurality of virtual characters on the graphical user interface, wherein the plurality of virtual characters comprise a first virtual character and at least one second virtual character, the first virtual character is configured to execute a virtual operation according to a touch event of a user on the touch display screen, and the virtual operation comprises a skill operation for the at least one second virtual character;

rendering a skill control on the graphical user interface, wherein the skill control corresponds to the skill operation;

in response to that a first touch event for the skill control is detected, rendering a target selection control in a vicinity of the skill control, the target selection control comprising a plurality of sub-controls, each sub-control corresponding to a predetermined target selection condition and the target selection condition being configured to select a target of the skill operation from the at least one second virtual character;

detecting a second control event for the target selection control, determining a present target selection condition according to the sub-control presently selected in response to the second touch event, and selecting at least one second virtual character consistent with the present target selection condition in real time from a predetermined distance range as the target of the skill operation; and in response to that the end of the second touch event is detected, controlling the first virtual character to execute the skill operation on the target which is presently selected.

2. The method as claimed in claim 1, wherein the method further comprises: identifying at least one of the sub-control which is presently selected and the target which is presently selected in real time.

3. The method as claimed in claim 1, wherein the method further comprises: displaying a connecting line in real time between the first virtual character and the target which is presently selected.

4. The method as claimed in claim 1, wherein the predetermined distance range is a circular region, wherein a circle center of the circular region is a real-time position of the first virtual character, and a radius of the circular region is a predetermined length.

5. The method as claimed in claim 1, wherein, after the first touch event for the skill control is detected and before the second touch event ends, the predetermined distance range is displayed in a predetermined manner.

6. The method as claimed in claim 1, wherein the first touch event is one of the following operations for the skill control:
tap, long press, double tap and swipe.

7. The method as claimed in claim 1, wherein the second touch event and the first touch event are continuous touch events.

8. The method as claimed in claim 1, wherein the skill control is circular, and the target selection control is a ring-shaped control surrounding the skill control.

9. The method as claimed in claim 1, wherein a manner for determining that the second touch event ends comprises one of the followings: determining termination of a contact between a touch character and the touch display screen, and determining a touch point is moved out of the target selection control.

10. A virtual character control apparatus, applied to a mobile terminal and the mobile terminal obtaining a graphical user interface by executing a software application on a processor and performing rendering on a touch display screen, the apparatus comprising:
a virtual character rendering component, arranged to render a plurality of virtual characters on the graphical user interface, wherein the plurality of virtual characters comprise a first virtual character and at least one second virtual character, the first virtual character is configured to execute a virtual operation according to a touch event of a user on the touch display screen, and the virtual operation comprises a skill operation for the at least one second virtual character;
a skill control rendering component, arranged to render a skill control on the graphical user interface, wherein the skill control corresponds to the skill operation;
a target selection control rendering component, arranged to, in response to that a first touch event for the skill control is detected, render a target selection control in a vicinity of the skill control, the target selection control comprising a plurality of sub-controls, each sub-control corresponding to a predetermined target selection condition and the target selection condition being configured to select a target of the skill operation from the at least one second virtual character;
a target selection component, arranged to detect a second control event for the target selection control, determine a present target selection condition according to the sub-control presently selected in response to the second touch event and select at least one second virtual character consistent with the present target selection condition in real time from a predetermined distance range as the target of the skill operation; and
a skill operation component, arranged to, in response to that the end of the second touch event is detected, control the first virtual character to execute the skill operation on the target which is presently selected.

11. A computer-readable and non-transitory storage medium, on which at least one computer program is stored, wherein the at least one computer program being executed by a processor to implement the virtual character control method as claimed in claim 1.

12. An electronic device, comprising:
a processor; and
a memory, connected with the processor and configured to store at least one executable instruction of the processor,
wherein the processor is arranged to execute the at least one executable instruction, and the at least one executable instruction comprises:
rendering a plurality of virtual characters on the graphical user interface, wherein the plurality of virtual characters comprise a first virtual character and at least one second virtual character, the first virtual character is configured to execute a virtual operation according to a touch event of a user on the touch display screen, and the virtual operation comprises a skill operation for the at least one second virtual character;
rendering a skill control on the graphical user interface, wherein the skill control corresponds to the skill operation;
in response to that a first touch event for the skill control is detected, rendering a target selection control in a vicinity of the skill control, the target selection control comprising a plurality of sub-controls, each sub-control corresponding to a predetermined target selection condition and the target selection condition being configured to select a target of the skill operation from the at least one second virtual character;
detecting a second control event for the target selection control, determining a present target selection condition according to the sub-control presently selected in response to the second touch event, and selecting at least one second virtual character consistent with the present target selection condition in real time from a predetermined distance range as the target of the skill operation; and
in response to that the end of the second touch event is detected, controlling the first virtual character to execute the skill operation on the target which is presently selected.

13. The method as claimed in claim 1, wherein types and number of the target selection conditions are defined in a setting interface.

14. The method as claimed in claim 2, wherein an identification manner comprises one of the followings: distinctive display, highlighted display, an additional indication mark.

15. The method as claimed in claim 2, wherein a type of the connecting line comprises one of the followings: a straight line, a curve, a solid line and a curve.

16. The method as claimed in claim 2, wherein the connecting line is used for pointing to the target which is presently selected, and in response to that the target which is presently selected departs from the predetermined distance range being pointed to, the connecting line is switched to a new target consistent with the present target selection condition.

17. The method as claimed in claim 2, wherein in response to that there is no target consistent with the present target selection condition within the predetermined distance range or an unique target originally consistent with the present target selection condition departs from the predetermined distance range, hiding the connecting line.

18. The method as claimed in claim 4, wherein the circular region is distinctively displayed on a ground within the predetermined distance range in the user interaction interface.

19. The method as claimed in claim 4, wherein all of the second virtual characters within the predetermined distance range are marked.

20. The method as claimed in claim 1, wherein controlling the first virtual character to execute the skill operation on the target which is presently selected through one touch operation or multiple touch operations.

\* \* \* \* \*